(12) United States Patent
Kim et al.

(10) Patent No.: US 6,856,108 B2
(45) Date of Patent: Feb. 15, 2005

(54) SWITCHED RELUCTANCE MOTOR AND INITIAL ACTIVATING METHOD THEREOF

(75) Inventors: Sang Young Kim, Kyungki-do (KR); Yo Han Lee, Seoul (KR); Jun Young Lim, Inchun-si (KR); Yong Won Choi, Daejun-si (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 10/376,263

(22) Filed: Mar. 3, 2003

(65) Prior Publication Data

US 2004/0036440 A1 Feb. 26, 2004

(30) Foreign Application Priority Data

Aug. 23, 2002 (KR) ................................ 10-2002-0050155

(51) Int. Cl.[7] ................................................ H02P 7/05
(52) U.S. Cl. ........................ 318/254; 318/701; 318/431
(58) Field of Search ........................ 318/254, 430–431, 318/685, 696, 701

(56) References Cited

U.S. PATENT DOCUMENTS

| | | | |
|---|---|---|---|
| 4,853,571 A | | 8/1989 | Smith et al. |
| 5,266,855 A | | 11/1993 | Smith et al. |
| 5,990,651 A | * | 11/1999 | Iwazawa et al. ............ 318/685 |
| 6,091,170 A | * | 7/2000 | Mayes et al. ............. 310/68 B |
| 6,700,348 B2 | * | 3/2004 | Lim ........................... 318/778 |

* cited by examiner

*Primary Examiner*—Bentsu Ro
(74) *Attorney, Agent, or Firm*—Greenblum & Bernstein, P.L.C.

(57) ABSTRACT

Switched reluctance motor and an initial activating method thereof in which an aligning pulse is applied to a stator to make a rotor wait at a normal torque generating region to be driven, preventing the rotor from rotating in a direction reverse to a target rotating direction. The standby position of the rotor in the switched reluctance motor is sensed. When the standby position of the rotor corresponds to a reverse torque generating region where a torque causing rotation in a direction reverse to a target rotating direction is generated, an aligning pulse is applied to the stator, causing the rotor to rotate to a normal torque generating region where a torque causing rotation in a normal direction corresponding to the target rotating direction is generated. A driving pulse is then to the stator, causing the rotor waiting at the normal torque generating region to rotate in the normal direction.

9 Claims, 6 Drawing Sheets

SWITCHED RELUCTANCE MOTOR AND INITIAL ACTIVATING METHOD THEREOF

CROSS-REFERENCE TO RELATED APPLICATION

The present application claims priority under 35 U.S.C. § 119 of Korean Patent Application No. 2002-50155, filed on Aug. 23, 2002, the disclosure of which is expressly incorporated by reference herein in its entirety.

BACKGROUND OF THE INVENTION

1. Field of the Invention

The present invention relates to a switched reluctance motor and an initial activating method thereof, and more particularly to a switched reluctance motor and an initial activating method thereof in which an aligning pulse is applied to a stator in order to make a rotor wait at a normal torque generating region to be driven, thereby preventing the rotor from rotating in a direction reverse to a target rotating direction.

2. Description of the Related Art

FIG. 1 is a sectional view illustrating the structure of a general switched reluctance motor. FIG. 2 is a circuit diagram illustrating the circuit configuration of the general switched reluctance motor. The general switched reluctance motor will now be described in detail with reference to FIGS. 1 and 2.

As shown in FIGS. 1 and 2, the switched reluctance motor (SRM) includes a driving control unit (not shown), a stator 20 carrying field coils W1 to W3 wound thereon while receiving current from the driving control unit, and a rotor 10 arranged inside the stator 20, and adapted to rotate in one direction by a reluctance torque generated between the stator 20 and the rotor 10 when current flows through the field coils W1 to W3.

The stator 20 includes a yoke having a cylindrical structure opened at upper and lower ends thereof, and a plurality of poles radially protruded from the inner surface of the yoke toward the rotor 10 while being uniformly spaced apart from one another in a circumferential direction. Field coils W1 to W3, which are also included in the stator 20, are each wound on a respective protruded pole 21. The number of protruded poles 21 may be determined in accordance with the kind of the motor used, even though the illustrated stator 20 has six poles.

The rotor 10 includes a rotor core 18 having a laminated structure. The rotor core 18 is provided with six poles 11 protruded from the outer surface of the rotor core 18 while being uniformly spaced apart from one another in a circumferential direction. A rotating shaft 17 is axially mounted to the central portion of the rotor 10 so that it rotates along with the rotor 10, and externally transmits the driving force of the motor. A pair of bearings 19 are arranged at upper and lower portions of the rotating shaft 17 in order to rotatably support the rotor 10. The rotor core 18 is arranged between the upper and lower bearings 19.

The driving control unit receives a sensing signal from a sensor 30, such as a photo sensor or Hall sensor, adapted to sense the position and speed of the rotor 10, generating driving pulses for switching on/off switches SW1 and SW2 connected to respective field coils of each field coil pair including two field coils W1, W2 or W3 facing each other in order to allow current to flow through the field coil pairs respectively associated with the field coils W1, W2, and W3 in a sequential fashion.

The switching-on/off operations of two switches SW1 and SW2 are simultaneously carried out. In accordance with the simultaneous switching-on operations of the switches SW1 and SW2, the facing field coils W1, W2, and W3 are electrically connected, so that current from the driving control unit flows through those field coils. As the current flows through the field coils W1 to W3, a reluctance torque is generated between the stator 20 and the rotor 10, causing the rotor 10 to rotate in a direction of a minimum magnetic reluctance.

The above-mentioned switched reluctance motor is configured to make the rotor 10 wait at a particular position to be driven, using a magnetic force, in order to allow the rotor 10 to rotate in one direction. That is, the switched reluctance motor is provided with a ring magnet 15 arranged around the rotor 10 above the rotor 10 having a ring shape, and a parking magnet 16 arranged to face the ring magnet 15, and interacting with the ring magnet 15 to generate an interactive magnetic force. When the rotor 10 is stopped, an attractive magnetic force is generated between the ring magnet 15 and the parking magnet 16, causing the rotor 10 to be maintained at a particular position at which the rotor 10 can generate a torque for rotation in a normal direction.

The number of poles formed in the ring magnet 15 is determined based on the number of protruded poles provided at the motor. That is, when the number of protruded poles is n, the ring magnet 15 includes n N-poles, and n S-poles. On the other hand, the parking magnet 16 has one N-pole, and one S-pole, irrespective of the number of protruded poles in the motor.

When the switched reluctance motor is stopped, its rotor is positioned at a normal torque generating region or a reverse torque generating region. Such states of the rotor are shown in FIGS. 3 and 4, respectively. The switched reluctance motor shown in FIGS. 3 and 4 has a configuration including a rotor 10 having 6 protruded poles 11, and a stator 20 having 6 protruded poles 21. It is assumed that the target rotating direction, that is, the normal rotating direction, corresponds to a counterclockwise direction.

When current is applied to the protruded pole A of the stator 20 in a state in which the protruded pole A' of the rotor 10 does not move, it causes the protruded pole A' of the rotor 10 to rotate in a direction that causes the protruded pole A' to be aligned with the protruded pole A of the stator 20. That is, the protruded pole A' of the rotor 10 rotates in the normal, or counter-clockwise direction. The region where torque-causing rotation in the normal direction is generated is referred to as a "normal torque generating region." Reliable control is achieved in so far as the application of the driving current is carried out under the condition in which the protruded pole A' of the rotor is maintained at the normal torque-generating region.

The positional relation between the ring magnet 15 and the parking magnet 16 under the above-described condition in FIG. 3 will be described. One N-pole of the ring magnet 15 faces the S-pole of the parking magnet 16 such that its pole boundary line is aligned with the pole boundary line of the parking magnet 16. In this state, a maximum attractive force is generated between the ring magnet 15 and the parking magnet 16. By this maximum attractive force, the magnet torque generated between the ring magnet 15 and the parking magnet 16 becomes zero. As a result, the ring magnet 15 no longer rotates, so that it is stably maintained at a position where the rotation is stopped. The position where the rotation of the ring magnet 15 is stopped, that is, where the ring magnet 15 and parking magnet 16 are in stable equilibrium, in accordance with the magnet torque rendered to be zero, is referred to as a "stable equilibrium position (SEP)."

However, when the ring magnet 15 and parking magnet 16 have a positional relation shown in FIG. 4, the rotor 10 cannot be maintained at the normal torque-generating region. In other words, when one S-pole of the ring magnet 15 faces the S-pole of the parking magnet 16 such that its pole boundary line is aligned with the pole boundary line of the parking magnet 16, a maximum repulsive force is generated between the ring magnet 15 and the parking magnet 16. By this maximum repulsive force, the magnet torque generated between the ring magnet 15 and the parking magnet 16 becomes zero. As a result, the ring magnet 15 does not rotate, so that the ring magnet 15 and parking magnet 16 are in equilibrium.

In this state, however, the alignment between the pole boundary lines of the magnets 15 and 16 may be easily lost even when a small rotating force is applied to the ring magnet 15, because the equilibrium between those magnets are not maintained by the attractive force serving to attract the magnets toward each other, but maintained by the repulsive force serving to repulse the magnets away from each other. The moment the poles of different polarities between the ring magnet 15 and the parking magnet 16 face each other due to the loss of the pole boundary line alignment, a substantial torque is generated between the magnets 15 and 16. By this torque, the ring magnet 15 may be rotated in an unspecified direction. The position where the ring magnet 15 and parking magnet 16 are maintained in an equilibrium state only for a moment, that is, an unstable state, is referred to an "unstable equilibrium position (UEP)."

When the magnets 15 and 16 have a positional relation causing the unstable equilibrium, the pole A' of the rotor 10 is finally positioned within an angular range of −30° to 0°. When current is applied to the protruded pole A of the stator 20 in this state, it causes the protruded pole A' of the rotor 10 to rotate in a direction causing the protruded pole A' to be aligned with the protruded pole A of the stator 20, in a clockwise direction. That is, a torque causing rotation in a reverse direction is generated. The region where such a reverse torque is generated is referred to as a "reverse torque generating region." When driving current is applied in a state in which the protruded pole A' of the rotor 10 is maintained at the reverse torque generating region, the rotor 10 is rotated in a direction reverse to the target rotating direction. As a result, an appliance equipped with the motor may be abnormally controlled. Moreover, the durability of the motor is reduced. In severe cases, the appliance may break down.

SUMMARY OF THE INVENTION

The present invention has been made in view of the above mentioned problems involved with the related art, and a feature of the invention is to provide a switched reluctance motor and an initial activating method thereof in which an aligning pulse is applied to a stator in order to prevent a rotor from rotating in a direction reverse to a target rotating direction, while aligning the rotor with the stator, and subsequently cut off in order to release the rotor, causing the rotor to wait at a normal torque generating region to be driven, so that it is possible to stably and reliably control the rotating direction of the motor.

In accordance with one aspect, the present invention provides a switched reluctance motor having a stator having n poles radially inwardly protruded from an inner surface of the stator, and field coils respectively wound around the poles; a rotor arranged inside the stator, and adapted to rotate by a reluctance torque generated between the stator and the rotor; a ring magnet arranged around the rotor such that n N-poles thereof and n S-poles thereof are arranged around the rotor while forming a ring shape; a parking magnet arranged to face the ring magnet, and adapted to stop the rotor at a normal torque generating region by an attractive force effected between the parking magnet and the ring magnet; a sensor arranged to face the ring magnet opposite to the parking magnet, and adapted to detect information about a position and speed of the rotor; and a driving control unit adapted to apply a driving pulse to the stator, based on the information about the position and speed of the rotor detected by the sensor.

In an aspect of the invention the ring magnet may be affixed around one end portion of a shaft fixedly mounted to the rotor, and the ring magnet and the rotor may rotate together.

In another aspect of the invention the N and S poles of the ring magnet may be alternately arranged. Also, the parking magnet may have one N-pole, and one S-pole, each N and S-pole having substantially the same width as each pole of the ring magnet.

In a further aspect of the invention the sensor may include a first sensor facing the ring magnet at a side of the ring magnet opposite the parking magnet, and a second sensor spaced from the first sensor at a predetermined angle.

In yet another aspect of the invention, the first and second sensors of the sensor may generate respective first and second pulse signals in accordance with a periodic variation in polarity of the ring magnet sensed by the sensor, the first and second pulse signals are configured to be generated with a time difference corresponding to the angle between the first and second sensors.

In still a further aspect of the invention, the driving control unit applies an aligning pulse to the stator when the position of the rotor sensed by the sensor corresponds to a reverse torque-generating region. Additionally, the driving control unit applies, to the stator, a driving pulse configured to induce the rotor to rotate for a period of time from a rising edge of the second pulse signal to a falling edge of the first pulse signal, when the position of the rotor sensed by the sensor corresponds to a normal torque-generating region.

In accordance with another aspect, the present invention provides an initial activating method of a switched reluctance motor that includes sensing a standby position of a rotor; determining whether or not the sensed standby position of the rotor corresponds to a reverse torque generating region where a torque causing rotation in a direction reverse to a target rotating direction is generated; if it is determined that the sensed standby position of the rotor corresponds to the reverse torque generating region, applying an aligning pulse to the stator, rotating the rotor to a normal torque generating region where a torque causing rotation in a normal direction corresponding to the target rotating direction is generated; and applying a driving pulse to the stator, causing the rotor waiting at the normal torque generating region to rotate in the normal direction.

In a further aspect of the invention, the applying the aligning pulse includes applying the aligning pulse to the stator around poles included in the stator, aligning poles in the rotor with the poles of the stator, and cutting off the application of the aligning pulse for a predetermined time after the alignment, that the rotor is released to rotate to the normal torque generating region by a magnetic force effected between magnets respectively provided at the stator and the rotor.

An additional aspect of the invention, may include generating respective first and second pulse signals from respective first and second sensors, in accordance with a periodic variation in polarity of the magnet provided at the rotor, the generating further comprising generating the first and second pulse signals with a time difference corresponding to an angle between the first and second sensors.

In still a further aspect of the invention, the applying the driving pulse may include inducing the rotor to rotate for a period of time from a rising edge of the second pulse signal to a falling edge of the first pulse signal, when the sensed position of the rotor corresponds to a normal torque-generating region.

Other exemplary embodiments and advantages of the present invention may be ascertained by reviewing the present disclosure and the accompanying drawings.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
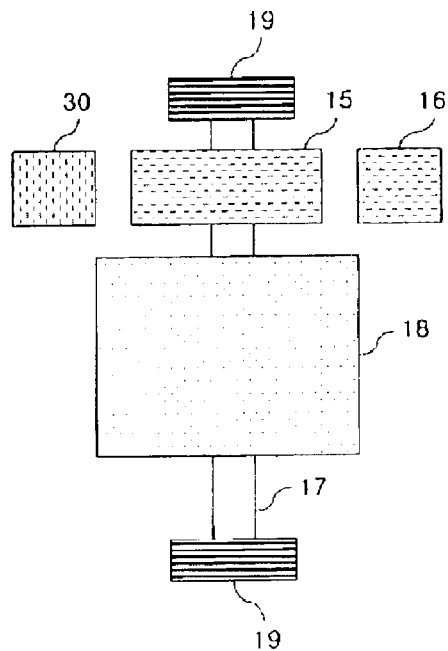
FIG. 1 is a sectional view illustrating the structure of a prior art switched reluctance motor.
Figure 2:
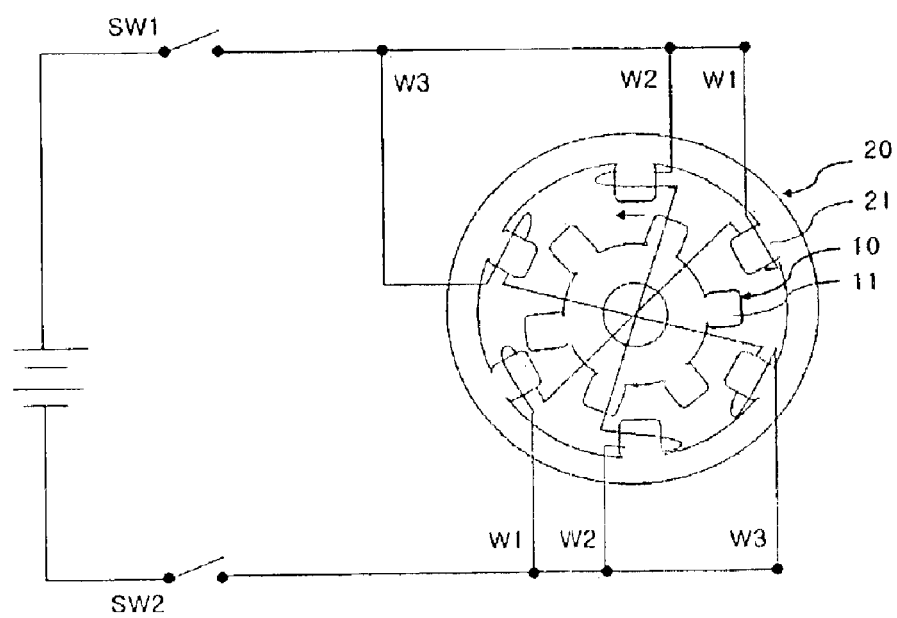
FIG. 2 is a circuit diagram illustrating the circuit configuration of the prior art switched reluctance motor.
Figure 3:
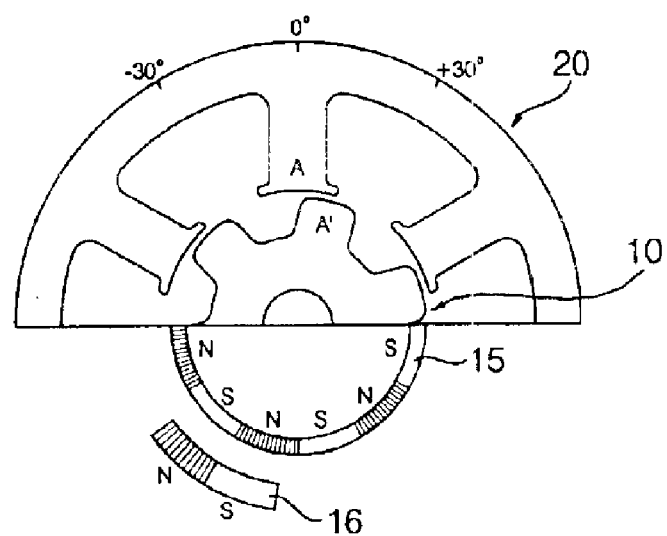
FIG. 3 is a view illustrating a stable equilibrium position where the rotor of the prior art switched reluctance motor waits to be driven.
Figure 4:
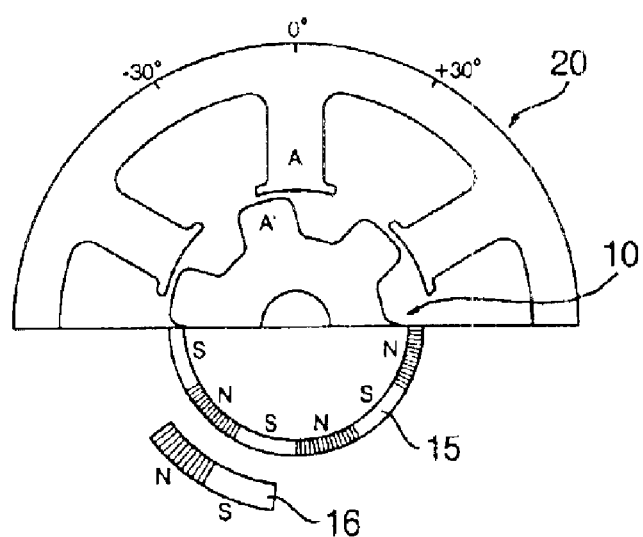
FIG. 4 is a view illustrating an unstable equilibrium position where the rotor of the prior art switched reluctance motor waits to be driven.

Now, preferred embodiments of the present invention will be described in detail with reference to the annexed drawings. The basic structure of a switched reluctance motor according to the present invention is similar to that of FIGS. 1 and 2. Accordingly, the switched reluctance motor will be described only in conjunction with the difference from that of FIGS. 1 and 2, with reference to FIGS. 5A–5C and 6.

Figure 5A:
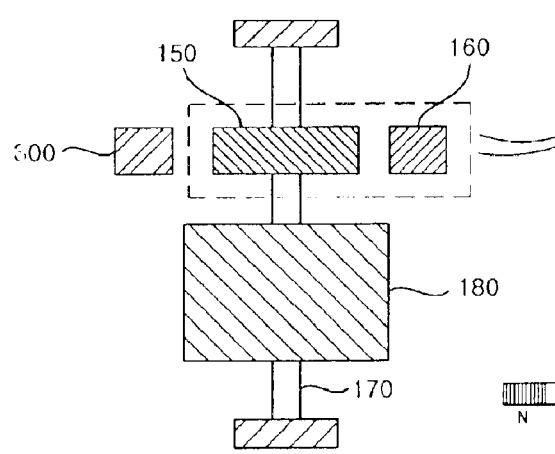
FIG. 5A is a sectional view illustrating the structure of a switched reluctance motor according to the present invention.
Figure 5B:
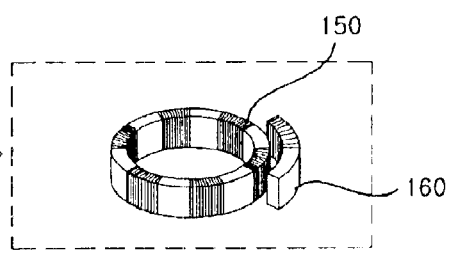
FIG. 5B is a perspective schematic view illustrating a ring magnet and parking magnet of the switched reluctance motor according to the present invention.
Figure 5C:
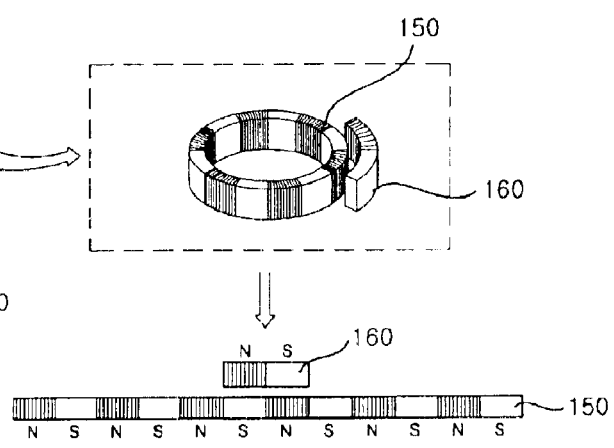
FIG. 5C is a plan schematic view illustrating the ring magnet and parking magnet of the switched reluctance motor according to the present invention.
Figure 6:
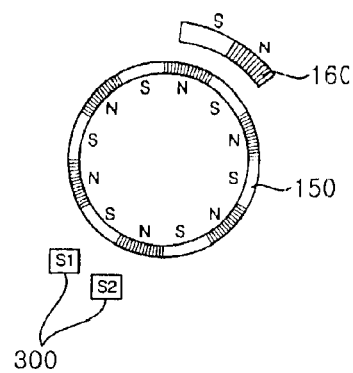
FIG. 6 is a plan view illustrating a ring magnet and a parking magnet included in the switched reluctance motor according to the present invention.

Referring to the drawings wherein like characters represent like elements, FIGS. 5A–5C are views illustrating the structure of the switched reluctance motor according to the present invention. FIG. 6 is a plan view illustrating a ring magnet and a parking magnet included in the switched reluctance motor according to the present invention.

The switched reluctance motor is controlled by a driving control unit (not shown) adapted to selectively apply an alignment pulse, based on the standby position of the motor.

The stator of the motor includes a cylindrical body opened at upper and lower ends thereof, n poles radially inwardly protruded from the inner surface of the cylindrical body, the poles being spaced apart from one another in a circumferential direction, and field coils respectively wound around the poles, and adapted to receive current from the driving control unit.

The rotor of the motor is configured to rotate by a reluctance torque generated between the rotor and the stator. This rotor includes a laminated rotor core 180. The rotor core 180 is provided with n poles protruded from the outer surface of the rotor core 180 the poles being uniformly spaced apart from one another in a circumferential direction. A rotating shaft 170 is axially mounted to the central portion of the rotor so that it rotates along with the rotor, externally transmitting the driving force of the motor.

The above-mentioned switched reluctance motor is configured to make the rotor wait at a particular position to be driven, using a magnetic force, to allow the rotor to rotate in a target direction (i.e., a normal direction). In order to harness this magnetic force, the switched reluctance motor includes a ring magnet 150 arranged around the rotor above the rotor and having a ring shape, and a parking magnet 160 arranged to face the ring magnet 150, and interacting with the ring magnet 150 to generate an interactive magnetic force.

When the rotor is stopped, an attractive magnetic force is generated between the ring magnet 150 and the parking magnet 160, causing the rotor to be maintained at a particular position. The ring magnet 150 is affixed around an end portion of the rotating shaft 170 (an upper shaft end portion in FIG. 5A) so that it is rotated along with the rotor. The ring magnet 150 has n N-poles and n S-poles alternately arranged in a circumferential direction.

The parking magnet 160 has an N-pole, and an S-pole facing the ring magnet 150. Each pole of the parking magnet 160 generally has the same width as each pole of the ring magnet 150. The parking magnet 160 serves to stop the rotor at the normal torque generating region by an attractive force generated between the ring magnet 150 and the parking magnet 160.

A sensing system 300 ("sensor") is arranged opposite to the ring magnet 150 so as to detect information about the position and speed of the rotor during the rotation of the rotor. The detection signal from the sensing system 300 is sent to the driving control unit. The sensing system 300 may include photo sensors, Hall sensors or any other sensors understood by those skilled in the art to satisfactorily work. In response to the detection signal, the driving control unit generates driving pulses for switching on/off switches connected to respective field coils of each field coil pair including two field coils facing each other in order to allow current to flow through all field coil pairs in a sequential fashion. As the switches are switched on in accordance with the driving pulses, the rotor is rotated. That is, when current flows through the field coils of the stator, a reluctance torque is generated between the stator and the rotor, causing the rotor to rotate in a direction of a minimum magnetic resistance.

Figure 7:
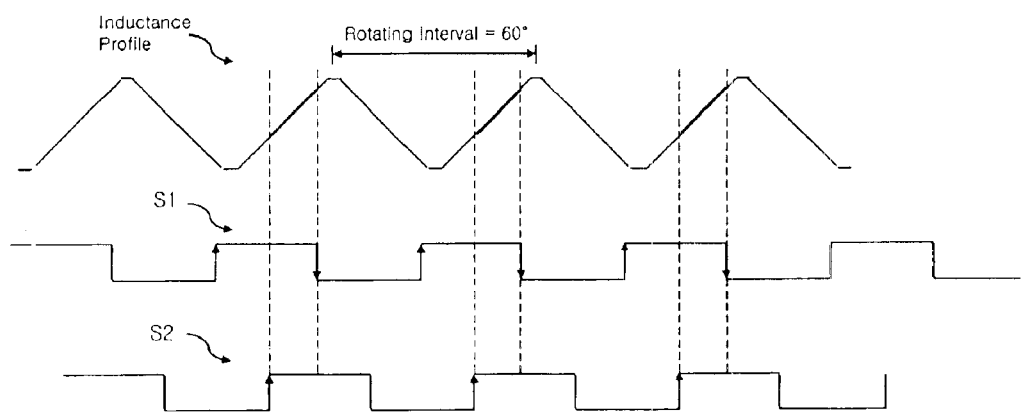
FIG. 7 is a waveform diagram illustrating waveforms of pulse signals generated from a sensor in the switched reluctance motor according to the present invention.

The rotation interval of the rotor per pole corresponds to 360°/n (n=6), and the rotation interval of the rotor according to a periodic variation in the polarity of the stator is 360°/n (n=6). Accordingly, the period of an inductance (magnetic induction) wave formed between the associated poles of the rotor and stator is approximately 60°. The waveforms of pulse signals generated by the sensing system included in the switched reluctance motor, and the profile of the inductance generated in the switched reluctance motor, are shown in FIG. 7.

The sensing system has a first sensor S1, and a second sensor S2. The first and second sensors S1 and S2 sense a variation in the magnetic field lines of the ring magnet 150, and generate first and second pulse signals, respectively. The first and second pulse signals have a time difference corresponding to the angle defined between the first and second sensors S1 and S2. The generation interval of each pulse signal is approximately 60°.

The driving control unit applies, to the stator, a driving pulse adapted to induce the rotor to rotate for a period of time from the rising edge of the second pulse signal to the falling edge of the first pulse signal. This period corresponds to a period in which the first and second pulse signals are logically identical to each other, that is, an AND period. This AND period is indicated by a bold line on an inductance profile shown in FIG. 7.

In the AND period, the inductance profile has a positive gradient. That is, the AND period corresponds to a normal torque-generating region in which the rotor is induced to rotate in a normal direction. Accordingly, the driving control unit controls the width of the driving pulse to control the rotating speed of the motor only when the position of the rotor sensed by the sensing system 300 corresponds to the normal torque-generating region. On the other hand, when the sensed position of the rotor corresponds to a reverse torque-generating region, the driving control unit applies an aligning pulse to the stator, causing the rotor to move to the normal torque-generating region.

Figure 8C:
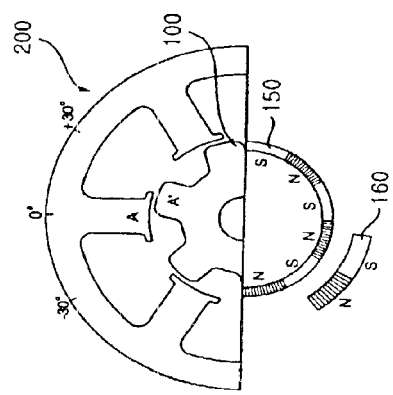
FIG. 8C is a view illustrating a second step in the aligning procedure carried out by the rotor of the switched reluctance motor according to the present invention.
Figure 8B:
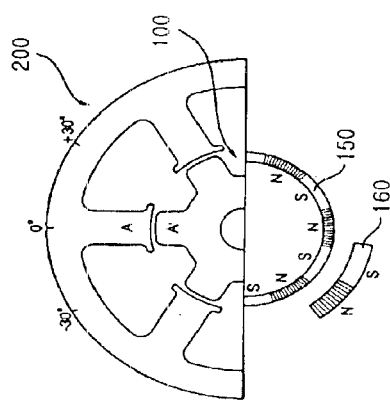
FIG. 8B is a view illustrating a second step in the aligning procedure carried out by the rotor of the switched reluctance motor according to the present invention.
Figure 8A:
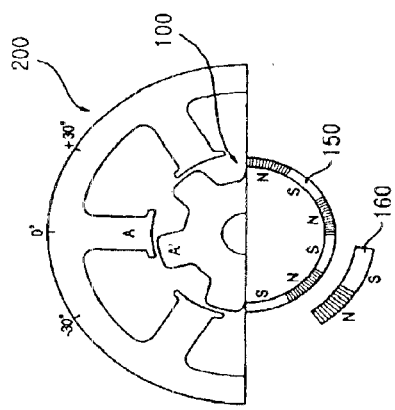
FIG. 8A is a view illustrating a first step in an aligning procedure carried out by the rotor of the switched reluctance motor according to the present invention.
Figure 9:
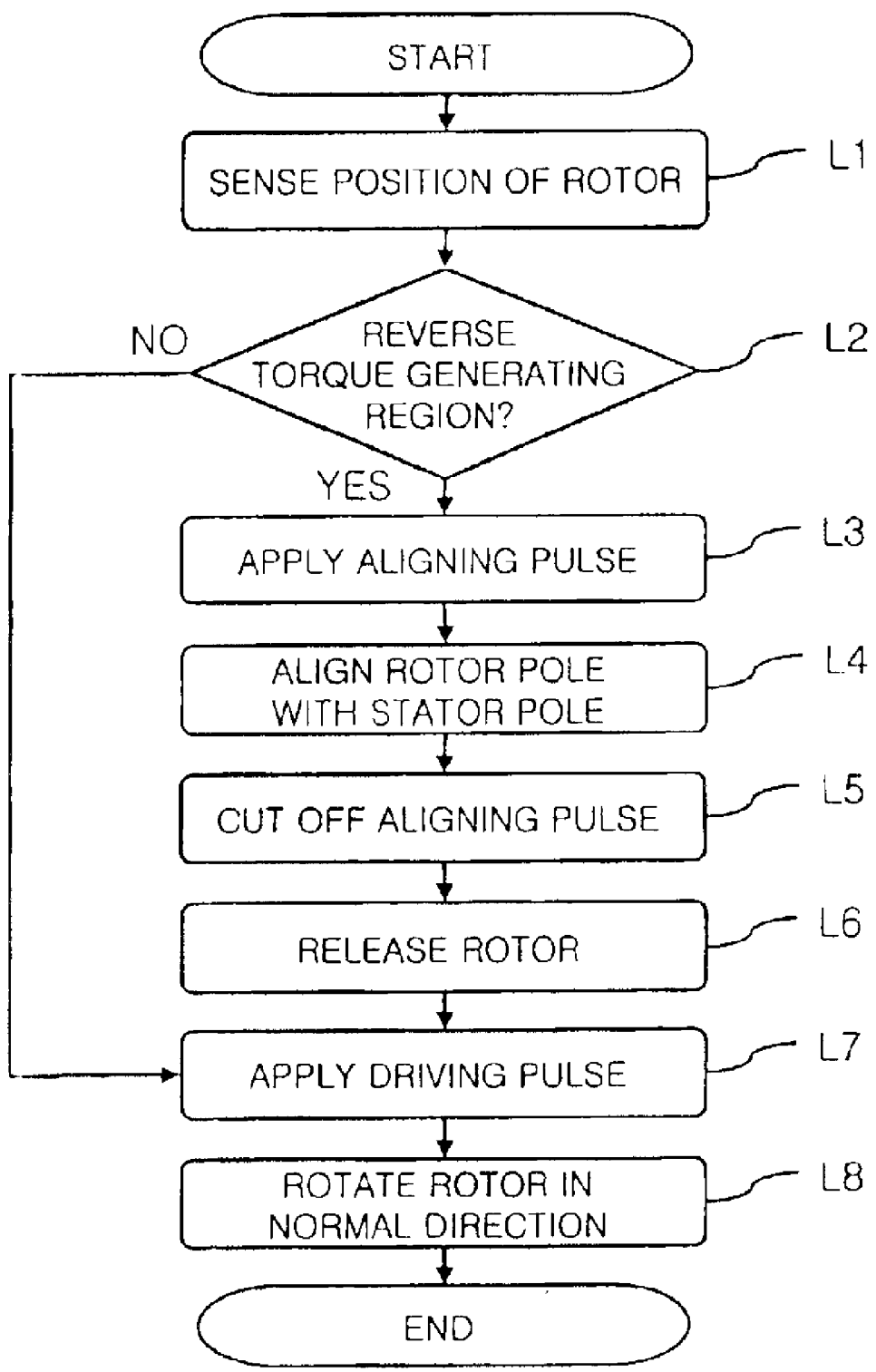
FIG. 9 is a flow chart illustrating a method for initially activating the switched reluctance motor in accordance with the present invention.

FIGS. 8A–8C are views together illustrating an aligning procedure in which the rotor is moved from the reverse torque-generating region to the normal torque-generating region. FIG. 9 is a flow chart illustrating a method for initially activating the switched reluctance motor in accordance with the present invention. In the following description, it is assumed that the target rotating direction, that is, the normal direction, is a counter-clockwise direction when viewing the figures, and the reverse direction is a clockwise direction.

Also, it is assumed that the number of the protruded poles, n, in each of the rotor and stator is 6, and the angle defined between adjacent ones of the protruded poles is 60°, as shown in FIGS. 8A–8C. When it is assumed that each protruded pole A of the stator, to which current is applied, has a central position at 0° (as shown in FIG. 8B), each protruded pole A' of the rotor has a displacement range of 30° in a rightward direction (as shown in FIG. 8C), and 30° in a leftward direction (as shown in FIG. 8A). For the convenience of description, the rightward direction from the central position is indicated by "+", whereas the leftward direction from the central position is indicated by "−".

As shown in FIG. 9, the position of the rotor waiting to be driven is first sensed by the sensing system 300 (Step L1).

It is then determined, based on the sensed result, whether or not the sensed position of the rotor corresponds to a reverse torque generating region (Step L2). Where the sensed position of the rotor corresponds to a normal torque generating region, a driving pulse is applied to the stator, causing the motor to be driven. On the other hand, where the sensed position of the rotor corresponds to the reverse torque-generating region, an aligning pulse is applied to the stator (Step L3).

The position of the stator 200, and the position of the rotor 100 waiting at the reverse torque generation region to be driven, are shown in FIG. 8A. At this time, the ring magnet 150 and parking magnet 160 are positioned such that their poles with the same polarity face each other, so that a repulsive force is effected between the ring magnet 150 and the parking magnet 160. As a result, the rotor 100 is in a very unstable equilibrium state.

As the aligning pulse is applied to the stator 200, an attractive force is effected between each pole A of the stator 200 and an associated pole A' of the rotor 100, so that the pole A' of the rotor 100 is rotated in a direction of a minimum magnetic reluctance, and then aligned with the pole A of the stator 200 (Step L4).

This procedure is referred to as an "aligning procedure", and shown in FIG. 8B. In this state, the ring magnet 150 and parking magnet 160 are positioned such that their poles with different polarities face each other under the condition in which their pole boundary lines are misaligned from each other, because each pole of the rotor 100 is forcibly aligned with the associated pole of the stator 200 by the aligning pulse applied to the stator 200.

The application of the aligning pulse is cut off for a predetermined time after the alignment (Step L5). As a result, the current flowing around each pole A of the stator 200 is cut off, so that the pole boundary lines of the ring magnet 150 and parking magnet 160 are aligned with each other by an attractive force effected between the magnets 150 and 160 (Step L6). At this time, each pole A' of the rotor 100 is arranged within an angle range of 0 to 30°. This procedure is referred to as a "releasing procedure."

The angle range of 0° to 30° is the normal torque generating region. The position of the stator 200, and the position of the rotor 100 waiting at the normal torque-generating region to be driven are shown in FIG. 8C.

When the rotor 100 waits at the normal torque-generating region to be driven, the driving control unit applies a driving pulse to the stator 200 (Step L7). In accordance with the driving pulse, the rotor 100 is rotated in the normal direction, that is, the counter-clockwise direction (Step L8). Thus, the motor is accurately controlled.

As apparent from the above description, the present invention provides a switched reluctance motor, and an initial activating method thereof in which an aligning pulse is selectively applied to a stator in accordance with the standby position of a rotor, and then subsequently cut off in order to release the rotor, causing the rotor to wait at a normal torque generating region to be driven in order to prevent the rotor from rotating in a direction reverse to a target rotating direction. Accordingly, it is possible to stably and reliably control the rotating direction of the motor. In addition, there is an advantage in that the durability and reliability of the appliance using the motor according to the present invention can be improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A switched reluctance motor comprising:
   a stator having n poles radially inwardly extending from an inner surface of said stator, a field coil wound about each pole of said n poles;
   a rotor positioned inside said stator, and configured to rotate by a reluctance torque generated between said stator and said rotor;
   a ring magnet positioned around said rotor such that n N-poles and n S-poles of the ring magnet are positioned around said rotor in a ring configuration;
   a parking magnet arranged to face said ring magnet, and configured to stop said rotor at a normal torque generating region by an attractive force between said parking magnet and said ring magnet;
   a sensor facing said ring magnet at a side of said ring magnet opposite said parking magnet, said sensor configured to detect information about a position and speed of said rotor; and
   a driving control unit configured to apply a driving pulse to said stator, based on the information about the position and speed of the rotor detected by said sensor,
   wherein said sensor comprises;
   a first sensor facing said ring magnet at a side of said ring magnet opposite said parking magnet; and
   a second sensor spaced from the first sensor at a predetermined angle,
   said first and second sensors of said sensor are configured to generate respective first and second pulse signals in accordance with a periodic variation in polarity of said ring magnet sensed by said sensor, and the first and second pulse signals are configured to be generated with a time difference corresponding to the angle between said first and second sensors, and
   wherein said driving control unit is further configured to apply an aligning pulse to said stator when the position of said rotor sensed by said sensor corresponds to a reverse torque-generating region.

2. The switched reluctance motor according to claim 1, wherein:
   said ring magnet is affixed around one end portion of a shaft fixedly mounted to said rotor; and
   said ring magnet and said rotor are configured to rotate together.

3. The switched reluctance motor according to claim 1, wherein the N and S poles of said ring magnet are alternately arranged.

4. The switched reluctance motor according to claim 3, wherein said parking magnet has one N-pole, and one S-pole, each said N and S-pole having substantially the same width as each said pole of said ring magnet.

5. The switched reluctance motor according to claim 1, wherein said driving control unit is configured to apply, to said stator, a driving pulse configured to induce said rotor to rotate for a period of time from a rising edge of the second pulse signal to a falling edge of the first pulse signal, when the position of said rotor sensed by said sensor corresponds to a normal torque-generating region.

6. An initial activating method of a switched reluctance motor comprising:
   (A) sensing a standby position of a rotor;
   (B) determining whether the sensed standby position of the rotor corresponds to a reverse torque-generating region where a torque-causing rotation in a direction reverse to a target rotating direction is generated;
   (C) applying an aligning pulse to a stator if said determining determines that the sensed standby position of the rotor corresponds to the reverse torque generating region;
   (D) rotating the rotor to a normal torque-generating region where a torque causing rotation in a normal direction corresponding to the target rotating direction is generated; and
   (E) applying a driving pulse to the stator;
   (F) rotating, in the normal direction, the rotor waiting at the normal torque-generating region.

7. The initial activating method according to claim 6, wherein said applying the aligning pulse comprises:
   applying the aligning pulse to the stator around poles included in the stator;
   aligning poles in the rotor with the poles of the stator; and
   cutting off the application of the aligning pulse for a predetermined time after the alignment, so that the rotor is released to rotate to the normal torque generating region by a magnetic force effected between magnets respectively provided at the stator and the rotor.

8. The initial activating method according to claim 7, further comprising:
   generating respective first and second pulse signals from respective first and second sensors, in accordance with a periodic variation in polarity of the magnet provided at the rotor, said generating further comprising generating the first and second pulse signals with a time difference corresponding to an angle between the first and second sensors.

9. The initial activating method according to claim 6, wherein said applying the driving pulse comprises inducing the rotor to rotate for a period of time from a rising edge of the second pulse signal to a falling edge of the first pulse signal, when the sensed position of the rotor corresponds to a normal torque-generating region.

* * * * *